United States Patent [19]

Kobayashi et al.

[11] 4,312,796

[45] Jan. 26, 1982

[54] RESIN COMPOSITION

[75] Inventors: Toshiaki Kobayashi, Kamakura; Teruo Takeuchi, Yokohama; Mamoru Nakamura, Takaoka, all of Japan

[73] Assignee: Nippon Zeon Co., Ltd., Japan

[21] Appl. No.: 85,054

[22] Filed: Oct. 15, 1979

[30] Foreign Application Priority Data

Oct. 19, 1978 [JP] Japan .................. 53-128867
Dec. 27, 1978 [JP] Japan .................. 53-161366

[51] Int. Cl.$^3$ .................. C08K 5/09; C08K 3/32
[52] U.S. Cl. .................. 260/23 XA; 260/45.75 V; 260/45.75 S; 260/45.75 T
[58] Field of Search .................. 260/45.75 V, 45.75 S, 260/45.75 T, 23 XA; 526/207

[56] References Cited

U.S. PATENT DOCUMENTS

| | | | |
|---|---|---|---|
| 2,744,881 | 5/1956 | Hendricks et al. | 260/45.75 V |
| 3,367,997 | 2/1968 | Smith | 260/45.75 V |
| 3,438,954 | 4/1969 | Christen et al. | 526/207 |
| 3,640,950 | 2/1972 | Weisfeld | 260/45.75 S |
| 3,879,344 | 4/1975 | Bakassian | 260/45.75 V |

FOREIGN PATENT DOCUMENTS

1098714  2/1961  Fed. Rep. of Germany ...... 526/207

OTHER PUBLICATIONS

Data Sheets Nos. 13, 19 and 20 of Associated Lead Manufacturers Ltd. published Apr. 1964, *Tin and Its Uses*–No. 77, 1968–pp. 14 and 15.

*Primary Examiner*—V. P. Hoke
*Attorney, Agent, or Firm*—Wenderoth, Lind & Ponack

[57] ABSTRACT

A resin composition which does not substantially corrode molds, said composition being obtained by blending (I) 100 parts by weight of a resin composition composed of 5 to 80% by weight of (A) an acrylonitrile-butadiene-styrene copolymer resin or a methacrylic ester-butadiene-styrene copolymer resin and 95 to 20% by weight of (B) a vinyl chloride resin obtained by polymerizing vinyl chloride or a monomeric mixture composed mainly of vinyl chloride in the presence of a cycloolefin compound, with (II) 0.5 to 15 parts by weight of (C) a lead-type stabilizer comprising an inorganic acid salt of lead and an organic acid salt of lead in a weight ratio of from 1:10 to 15:1 or (D) a tin-type stabilizer comprising an alkyltin maleate and an alkyltin mercaptide in a weight ratio of from 1:10 to 15:1.

4 Claims, No Drawings

RESIN COMPOSITION

This invention relates to an improvement in a fire-retardant resin composition for molding, and more specifically, to a fire-retardant resin composition for molding, especially injection molding, which does not substantially corrode molds.

In recent years, synthetic resins used as building materials and in furniture, vehicles, electrical appliances, etc. have been required to possess fire retardancy. Thus, when used in these applications, an acrylonitrile-butadiene-styrene copolymeric resin (to be referred to as ABS resin) is often required to have fire retardancy.

One method for imparting fire retardancy to the ABS resin comprises blending it with a polyvinyl chloride resin (to be referred to as PVC resin). This blended resin composition is a new material in which the defects of the two component resins are offuet by each other to impart fire retardancy to the ABS resin and impact strength to the PVC resin. It has gradually gained widespread acceptance in the field of injection molding partly because it is lower in cost than other fire-retardant resins.

As injection molding of the fire-retardant ABS/PVC blend resin has increased, it has become apparent that mold corrosion occurs to a not in significant extent during injection molding or during storage of molds after use in injection molding. Molds for use in injection molding, in many cases, have complicated and precise profiles and are very expensive. Thus, corrosion of such molds within a short period of time in use is an economically serious problem.

Resins for injection molding which have been used heretofore mainly include polyethylene, polypropylene, polystyrene, and ABS resin. Halogen-containing resin compositions have scarcely been used, and therefore, the problem of mold corrosion has not arisen.

To meet the requirement for fire retardancy in recent years, however, halogen-containing resin compositions have gained acceptance, and the problem of mold corrosion by these resins has come to the fore.

Treatment of molds with antirust agents during or after injection molding is now widespread as a measure against mold corrosion. It is difficult, however, to treat every part of a mold, and much labor and time are required on the job. Another countermeasure is to produce molds from corrosion-resistant steel material [Synthetic Resin, 24, (8), 5 (1978)]. Such steel material will be perhaps very long before the anti-corrosive steel material becomes commercially acceptable. At present, therefore, fire-retardant resins having a minimum tendency to cause mold corrosion are strongly desired.

It is an object of this invention therefore to provide a fire-retardant resin composition for molding, especially injection molding, which has a reduced tendency toward mold corrosion.

We have found that the above object is achieved by a resin composition obtained by blending [I] 100 parts by weight of a resin composition composed of 5 to 80% by weight of (A) an acrylonitrile-butadiene-styrene copolymer resin or a methacrylic ester-butadiene-styrene copolymer resin and 95 to 20% by weight of (B) a vinyl chloride resin obtained by polymerizing vinyl chloride or a monomeric mixture composed mainly of vinyl chloride in the presence of a cycloolefin compound, with [II] 0.5 to 15 parts by weight of (C) a lead-type stabilizer comprising an inorganic acid salt of lead and an organic acid salt of lead in a weight ratio of from 1:10 to 15:1 or (D) a tin-type stabilizer comprising an alkyltin maleate and an alkyltin mercaptide in a weight ratio of from 1:10 to 15:1.

A resin generally known as ABS resin can be used as the acrylonitrile-butadiene-styrene copolymer resin (A). Typical examples are a copolymer obtained by graft polymerizing a monomeric mixture consisting mainly of acrylonitrile, styrene, and/or alpha-methylstyrene with a trunk polymer having butadiene as a main structural unit, and a composition obtained by mixing this graft copolymer with an acrylonitrile-styrene copolymer. It also includes products obtained by replacing a part of acrylonitrile in the above compositions with a methacrylic acid ester or acrylic acid ester. Resins comprising 10 to 40% by weight of butadiene, 10 to 40% by weight of acrylonitrile and 30 to 70% by weight of styrene are preferred in view of their properties. Resins obtained by replacing a part or the whole of styrene in the aforesaid resins by alphamethylstyrene have superior thermal stability.

The methacrylic acid ester-butadiene-styrene copolymer (A) used in this invention is a resin generally known as MBS resin. It includes products obtained by substituting acrylonitrile in the aforesaid ABS resins wholly by a methacrylic acid ester, and products obtained by substituting a part of the methacrylate of the above products with acrylonitrile or an acrylic acid ester.

Of course, the ABS resin and the MBS resin may be used in combination with each other. There is no particular restriction on the method of producing these resins, and any known methods can be used.

In the production of the vinyl chloride resin (B), monomers other than vinyl chloride can be jointly used. Examples of the other monomers include olefins, vinyl esters, unsaturated acids, unsaturated acid esters, unsaturated acid anhydrides, unsaturated nitrile compounds and vinylidene compounds. The monomeric mixture composed mainly of vinyl chloride consists of at least 70% by weight of vinyl chloride and not more than 30% by weight of such another monomer.

The cycloolefin compound includes cycloolefins and ring-substituted products of cycloolefins. Examples of the cycloolefins include cyclic monoolefins such as cyclobutene, cyclopentene, cyclohexene and cyclooctene; and cyclic diolefins such as cyclopentadiene, cyclohexadiene and cyclooctadiene-1,3. The ring-substituted products of cycloolefins denote products obtained by ring-substitution of the cycloolefins by, for example, halogens such as chlorine or bromine, alkyl or alkenyl groups having 1 to 8 carbon atoms, preferably 1 to 4 carbon atoms such as methyl, ethyl, propyl, butyl, hexyl, 2-ethylhexyl, allyl, isopropenyl, and butenyl, and alkoxy groups having 1 to 8 carbon atoms, preferably 1 to 4 carbon atoms such as methoxy, ethoxy, propoxy or butoxy. They include compounds usually known as terpenes, such as terpinene and terpinolene. The polymerization of vinyl chloride with or without a comonomer is carried out by a usual radical polymerization method. The cycloolefin compound is added in an amount of 0.005 to 5 parts by weight per 100 parts by weight of the monomer or monomeric mixture to the polymerization system before the initiation of the polymerization or during the time from the initiation to the end of the polymerization reaction. Details of the polymerization method are described, for example, in Japanese Patent Publication No. 48904/72. The vinyl chloride resin (B) may be a graft copolymer of vinyl chloride. The vinyl chloride resin (B) brings about the result contemplated by the present invention irrespective of its degree of polymerization, and therefore, its degree of polymerization is not particularly critical. For use in injection molding, it generally has a degree of polymerization of 250 to 2,000, preferably 300 to 1,000.

It is undesirable for the proportions of the ABS or MBS resin (A) and the vinyl chloride resin (B) to be outside the ranges specified in this invention. When the proportion of the resin (A) is less than 5% by weight and the proportion of (B) exceeds 95% by weight, the strength characteristics of the resulting composition are poor. When the proportion of (A) exceeds 80% by weight, and the proportion of (B) is less than 20% by weight, the fire retardancy of the resulting composition is reduced and its cost increases.

The inorganic acid salt of lead used as one component of the lead-type stabilizer (C) in the present invention includes tribasic lead sulfate, basic lead sulfite, dibasic lead phosphite, silica gel coprecipitated lead silicate, and white lead. Examples of the organic acid salt of lead as the other component are metal soaps such as tribasic lead maleate, tribasic lead phthalate, dibasic lead stearate, lead stearate and lead salicylate.

The alkyltin maleate used as one component of the tin-type stabilizer (D) includes, for example, poly(dibutyltin maleates), poly(dioctyltin maleates), dibutyltin bis(alkyl maleates), and dioctyltin bis(alkyl maleates).

Examples of the alkyltin mercaptide as the other component of the tin-type stabilizer (D) include mono- or di-alkyltin bis(alkylmercaptides) such as monobutyltin tris(alkylmercaptides), dibutyltin bis(alkyl mercaptides), di-methyltin bis(alkylmercaptides) and dioctyltin bis(alkylmercaptides); mono- or di-alkyltin bis(mercaptoacid ester salts) such as dibutyltin bis(alkylmercaptoacetate), dibutyltin bis(alkylmercaptopropionates), monobutyltin tris(alkylmercaptoacetates) and dioctyltin bis(alkylmercaptoacetates); thiobis (dialkyltin mercaptoacid ester salts); monoalkyltin sulfides; and dialkyltin sulfides.

In the present invention, the lead-type stabilizer (C) composed of at least one inorganic acid salt of lead and at least one organic acid salt of lead, or the tin-type stabilizer (D) composed of at least one alkyltin maleate and at least one alkyltin mercaptide is used. When the lead-type stabilizer (C) is used, it is preferred to use the alkyltin maleate jointly in order to improve heat stability further.

The weight ratio of the inorganic acid salt of lead to the organic acid salt of lead, and the weight ratio of the alkyltin maleate to the alkyltin mercaptide are both from 1:10 to 15:1, preferably from 1:7 to 10:1. When these weight ratios fall outside the above range, there is no appreciable effect of reducing mold corrosion as contemplated by the present invention.

The amount of the stabilizer (C) or (D) used is from 0.5 to 15 parts by weight per 100 parts by weight of a mixture of (A) the ABS resin or MBS resin and (B) the vinyl chloride resin. The amount can be properly chosen depending upon the molding conditions, the size of the molded article, etc. If the amount of the stabilizer is less than 0.5 part by weight, heat decomposition at the time of molding cannot be fully inhibited. If it exceeds 15 parts by weight, the cost becomes high, and the moldability of the resin composition and the properties of the resulting molded products are adversely affected.

The resin composition of this invention may contain additives of the types and amounts which do not adversely affect the results contemplated by the present invention. Examples of such additives are other heat stabilizers usually employed for PVC resins such as metal soap-type stabilizers and epoxy-type stabilizers, lubricants, plasticizers, chelaters, antioxidants, ultraviolet absorbers, inorganic fillers, fire retardants, and pigments. When the ABS resin or MBS resin is used in a major proportion, it is preferred to add antimony trioxide as a fire retarding agent.

In preparing the resin composition of this invention, the ABS resin or MBS resin (A), the vinyl chloride resin (B), and the lead-type stabilizer (C) or the tin-type stabilizer (D) may be mixed simultaneously, or may be mixed by adding them in any desired order. Mixing is performed by using a suitable mixing device such as a Banbury mixer, kneader blender, Henschel mixer, ribbon blender, Hovert mixer, or extruder.

The resin composition of this invention is conducive to drastic reduction of the great tendency of conventional resin compositions to corrode molds, without scarcely changing the cost, properties and moldability of the conventional compositions. While the resin composition of this invention is especially effective for inhibiting mold corrosion in injection molding, it also works well on the inhibition of corrosion of steel materials in other processing methods such as extrusion molding.

The following examples illustrate the present invention more specifically. It should be understood however that the invention is in no way limited to these examples. The amounts in parts of the resins, additives, monomers and polymerization chemicals used in these examples are by weight.

EXAMPLE 1

In each run, the various resins and additives shown in Table 1 were put into a Henschel mixer simultaneously, and mixed at 120° C. to prepare a resin composition.

The resin composition was pelletized by an extruder. The pellets were kneaded for 3 minutes by a hot roll kept at 170° C. to form a sheet. The sheet was hot-pressed at 175° C. for 5 minutes to make a molded plate having a size of 40 mm×30 mm×3 mm.

Separately, steel pieces (S-55C) having a size of 100 mm×100 mm×5 mm and a well polished surface were provided (generally used in a mold for injection molding).

The molded plate were held between the polished surfaces of the two steel pieces described above, and heated for 1 hour in a Geer oven kept at 200° C. The assembly was taken out of the oven, and the molded plate was removed.

The steel pieces were allowed to stand in a constant-temperature chamber kept at a temperature of 25° C. and a humidity of 65±5% with their polished surfaces directed upward. The state of corrosion of those parts of the steel pieces which had been in contact with the molded plate was visually observed at different times to determine variations with time. The results are shown in Table 1.

TABLE 1

| Run No. | Invention | | | | Comparison | | |
| --- | --- | --- | --- | --- | --- | --- | --- |
|  | 1-1 | 1-2 | 1-3 | 1-4 | 1-5 | 1-6 | 1-7 |
| Compounding recipe (parts) | | | | | | | |

TABLE 1-continued

| Run No. | Invention | | | | Comparison | | |
|---|---|---|---|---|---|---|---|
| | 1-1 | 1-2 | 1-3 | 1-4 | 1-5 | 1-6 | 1-7 |
| ABS resin (*1) | 40 | 20 | 60 | 40 | 40 | 40 | 40 |
| Vinyl chloride resin (*2) | 60 | 80 | 40 | 60 | 60(*6) | 60 | 60 |
| Tribasic lead sulfate (*3) | 3 | 3 | 3 | 2 | 3 | 3 | — |
| Dibasic lead stearate (*3) | 1 | 1 | 1 | 5 | 1 | — | 1 |
| Lead stearate (*3) | 1 | 1 | 1 | 2 | 1 | — | 1 |
| Lubricant (*4) | 2 | 2 | 2 | 2 | 2 | 2 | 2 |
| Antimony trioxide (*5) | — | — | 4 | — | — | — | — |
| Corrosion test (*7) | | | | | | | |
| Immediately after heating | A | A | A | A | A | A | A |
| 1 day after heating | A | A | A | A | C | B | C |
| 5 days after heating | A | B | A | A | D | C | D |
| 10 days after heating | B | B | A | A | D | D | D |
| 30 days after heating | B | B | B | B | D | D | D |

(*1): JSR-ABS-35, a product of Japan synthetic Rubber, Co., Ltd.
(*2): A vinyl chloride resin having a specific viscosity (JIS K-6721) of 0.22 obtained by subjecting 250 parts of distilled water, 100 parts of vinyl chloride, 0.5 part of partially saponified polyvinyl acetate, 0.3 part of gelatin, 0.2 part of lauroyl peroxide and 0.5 part of cyclohexene to polymerization reaction at 65° C. for 20 hours.
(*3): A product of Nitto Chemical Industry, Co., Ltd.
(*4): A mixture of 1 part of Amide A2 (a product of Nippon Suiso Kogyo Co., Ltd.) and 1 part of calcium stearate (a product of Nitto Chemical Industry, Co., Ltd.).
(*5): A product of Nippon Seiko Co., Ltd.
(*6): A vinyl chloride resin having a specific viscosity (JIS K-6721) of 0.22 prepared by the same method as in the preparation of the vinyl chloride resin in (*2) above except that 1.5 parts of trichloroethylene was used instead of cyclohexene.
(*7): Standards of evaluation
A: A metallic luster remains.
B: A metallic luster is lost, but no red rust occurs.
C: A red rust occurs partly.
D: A red rust occurs almost entirely.

EXAMPLE 2

Vinyl chloride resins having the specific viscosities shown in Table 2 were prepared by subjecting 250 parts of distilled water, 100 parts of vinyl chloride, 0.5 part of partially saponified polyvinyl acetate, 0.3 part of gelatin, 0.2 part of lauroyl peroxide, and 0.3 part of each of the cycloolefin compounds shown in Table 2 to a polymerization reaction at 50° C. for 20 hours.

In each run, the same resin composition as in Example 1 was produced by using each of the above vinyl chloride resins instead of the vinyl chloride resin used in Run No. 1—1 of Example 1. Using these resin compositions, a corrosion test was performed in the same way as in Example 1. The results are shown in Table 2.

The same experiment as in Example 1 was conducted by using a vinyl chloride resin obtained in the same manner as above except that the cycloolefin compound was not used, instead of the vinyl chloride resin used in Run No. 1 of Example 1. The results are shown in Run No. 2-6 (Comparison).

TABLE 2

| Run No. | Cycloolefin compound | Specific viscosity of vinyl chloride resin | Corrosion test (*7) | | | | |
|---|---|---|---|---|---|---|---|
| | | | Immediately after heating | 1 day after heating | 5 days after heating | 10 days after heating | 30 days after heating |
| Invention | | | | | | | |
| 2-1 | Cyclopentene | 0.34 | A | A | A | B | B |
| 2-2 | Cyclopentadiene | 0.35 | A | A | A | B | B |
| 2-3 | 1-Chlorocyclohexene-1 | 0.39 | A | A | A | B | B |
| 2-4 | 3-Methylcyclohexene-1 | 0.36 | A | A | A | A | B |
| 2-5 | 3-Methoxycyclohexene-1 | 0.39 | A | A | A | B | B |
| Comparison | | | | | | | |
| 2-6 | None | 0.38 | A | C | D | D | D |

(*7): The same as the footnote to Table 1.

EXAMPLE 3

The same experiment as in Example 1 was performed except that the compounding recipes shown in Table 3 were used. The results are shown in Table 3.

TABLE 3

| Run No. | Invention | | Comparison |
|---|---|---|---|
| | 3-1 | 3-2 | 3-3 |
| Compounding Recipe (parts) | | | |
| MBS resin (*8) | 40 | 10 | 10 |
| PVC resin (*2) | 60 | 90 | 90(*6) |
| Tribasic lead sulfate (*3) | 3 | 3 | 3 |
| Dibasic lead stearate (*3) | 1 | 1 | 1 |
| Lead stearate (*3) | 1 | 1 | 1 |
| Lubricant (*4) | 2 | 2 | 2 |
| Corrosion test (*7) | | | |
| Immediately after heating | A | A | A |
| 1 day after heating | A | A | C |
| 5 days after heating | A | B | D |
| 10 days after heating | B | B | D |
| 30 days after heating | B | B | D |

(*2), (*3), (*4), (*6), and (*7) were the same as the footnote to Table 1.
(*8): Hi-blen B-203, a product of Nippon Zeon Co., Ltd.

EXAMPLE 4

The same experiment as in Example 1 was performed except that the compounding recipes shown in Table 4 were used. The results are also shown in Table 4.

TABLE 4

| Run No. | Invention | | | | | | | Comparison | | |
|---|---|---|---|---|---|---|---|---|---|---|
| | 4-1 | 4-2 | 4-3 | 4-4 | 4-5 | 4-6 | 4-7 | 4-8 | 4-9 | 4-10 |
| Compounding recipe | | | | | | | | | | |
| ABS resin (*1) | 50 | 20 | 70 | 50 | 50 | 50 | 50 | 50 | 50 | 50 |
| PVC resin (*2) | 50 | 80 | 30 | 50 | 50 | 50 | 50 | 50 | 50 | 50 (*6) |
| Alkyltin maleate (*9) | 2 | 2 | 2 | 1 | 4 | 1 | 2 | 4 | 0 | 2 |
| Alkyltin mercaptide (*10) | 2 | 2 | 2 | 1 | 1 | 4 | 6 | 0 | 4 | 2 |
| Lubricant (*4) | 3 | 3 | 3 | 3 | 3 | 3 | 3 | 3 | 3 | 3 |

TABLE 4-continued

| Run No. | Invention | | | | | | | Comparison | | |
|---|---|---|---|---|---|---|---|---|---|---|
| | 4-1 | 4-2 | 4-3 | 4-4 | 4-5 | 4-6 | 4-7 | 4-8 | 4-9 | 4-10 |
| Corrosion test (*7) | | | | | | | | | | |
| Immediately after heating | A | A | A | A | A | A | A | A | A | A |
| 1 day after heating | A | A | A | A | A | A | A | C | B | C |
| 5 days after heating | A | A | A | A | A | A | A | C | C | D |
| 10 days after heating | A | B | A | B | A | A | A | D | D | D |
| 30 days after heating | B | B | A | B | B | B | B | D | D | D |

(*9): Stann BM (N), a product of Sankyo Organic Synthesis Co., Ltd.
(*10): T-17MJ, a product of Katsuta Chemical Industry, Co., Ltd.
(*1), (*2), (*4), (*6), and (*7) are the same as the footnote to Table 1.

EXAMPLE 5

Vinyl chloride resins having the specific viscosities shown in Table 5 were produced by subjecting 250 parts of distilled water, 100 parts of vinyl chloride, 0.5 part of partially saponified polyvinyl acetate, 0.3 part of gelatin, 0.2 part of lauroyl peroxide and 0.3 part of each of the cycloolefin compounds shown in Table 5 to polymerization reaction for 20 hours at 50° C. (55° C. in the comparative run).

The same resin composition as in Example 1 was produced by using each of the resulting vinyl chloride resins instead of the vinyl chloride resin used in Run No. 4-1 of Example 4. Using these resin compositions, the same corrosion test as in Example 1 was conducted. The results are shown in Table 5.

TABLE 5

| Run No. | Cycloolefin compound | Specific viscosity of vinyl chloride resin | Corrosion test (*7) | | | | |
|---|---|---|---|---|---|---|---|
| | | | Immediately after heating | 1 day after heating | 5 day after heating | 10 days after heating | 30 days after heating |
| Invention | | | | | | | |
| 5-1 | Cyclopentene | 0.34 | A | A | A | A | B |
| 5-2 | Cyclopentadiene | 0.35 | A | A | A | A | B |
| 5-3 | 1-Chlorocyclohexene-1 | 0.39 | A | A | A | A | B |
| 5-4 | 3-Methylcyclohexene-1 | 0.36 | A | A | A | A | A |
| 5-5 | 3-Methoxycyclohexene-1 | 0.39 | A | A | A | A | B |
| Comparison | | | | | | | |
| 5-6 | None | 0.38 | A | C | D | D | D |

(*7): The same as in Table 1.

EXAMPLE 6

The same experiment as in Example 4 was performed except that the compounding recipes shown in Table 6 were used. The results are shown in Table 6.

TABLE 6

| Run No. | Invention | | Comparison | | |
|---|---|---|---|---|---|
| | 6-1 | 6-2 | 6-3 | 6-4 | 6-5 |
| Compounding Recipe | | | | | |
| MBS resin (*8) | 50 | 10 | 10 | 10 | 10 |
| PVC resin (*2) | 50 | 90 | 90 | 90 | 90(*6) |
| Alkyltin maleate (*9) | 2 | 2 | 4 | 0 | 2 |
| Alkyltin mercaptide (*10) | 2 | 2 | 0 | 4 | 2 |
| Lubricant (*4) | 3 | 3 | 3 | 3 | 3 |
| Corrosion test (*7) | | | | | |
| Immediately after heating | A | A | A | A | A |
| 1 day after heating | A | A | C | B | C |
| 5 days after heating | A | A | C | C | D |
| 10 days after heating | A | B | D | D | D |
| 30 days after heating | B | B | D | D | D |

(*2), (*6), and (*7) are the same as the footnote to Table 1; (*8) is the same as the footnote to Table 3; and (*9) and (*10) are the same as the footnote to Table 4.

What is claimed is:

1. A method of molding an acrylonitrile-butadiene-styrene resin composition which does not substantially corrode molds, said composition being obtained by blending:
   (I) 100 parts by weight of a resin composition composed of 50-80% by weight of (A) an acrylonitrile-butadiene-styrene copolymer resin and 95-20% by weight of (B) a vinyl chloride resin obtained by suspension polymerizing vinyl chloride or a monomeric mixture composed mainly of vinyl chloride in the presence of a cycloolefin which is a chain transfer agent, with
   (II) 0.5 to 15 parts by weight of a stabilizer selected from the group consisting of tribasic lead sulphate in admixture with lead stearate and dibasic lead phosphite in admixture with lead stearate and, wherein the ratio of lead sulphate or phosphite to lead stearate is 1:10 to 15:1.

2. The composition of claim 1 wherein said acrylonitrile-butadiene-styrene copolymer resin comprises 10-40% by weight of acrylonitrile, 10-40% by weight of butadiene and 30-70% by weight of styrene.

3. The composition of claim 1 wherein said monomeric mixture composed mainly of vinyl chloride consists of at least 70% by weight of vinyl chloride and not more than 30% by weight of an olefin, vinyl ester, unsaturated acid, unsaturated acid ester, unsaturated acid anhydride, unsaturated nitrile compound or vinylidene compound.

4. The composition of claim 1 wherein said cycloolefin compound is a cyclic monoolefin, a cyclic diolefin, or a cyclic mono- or di-olefin ring-substituted with a halogen atom or an alkyl, alkenyl or alkoxy group having 1 to 8 carbon atoms.

* * * * *